(12) United States Patent
Yano et al.

(10) Patent No.: US 8,206,678 B2
(45) Date of Patent: Jun. 26, 2012

(54) VAPOR GROWN CARBON FIBER, PRODUCTION METHOD THEREOF AND COMPOSITE MATERIAL CONTAINING THE CARBON FIBER

(75) Inventors: Kotaro Yano, Kanagawa (JP); Ryuji Yamamoto, Kanagawa (JP); Toshio Morita, Kanagawa (JP)

(73) Assignee: Showa Denko K.K., Tokyo (JP)

( * ) Notice: Subject to any disclaimer, the term of this patent is extended or adjusted under 35 U.S.C. 154(b) by 258 days.

(21) Appl. No.: 11/628,801

(22) PCT Filed: Jun. 7, 2005

(86) PCT No.: PCT/JP2005/010750
§ 371 (c)(1),
(2), (4) Date: Dec. 7, 2006

(87) PCT Pub. No.: WO2005/121420
PCT Pub. Date: Dec. 22, 2005

(65) Prior Publication Data
US 2008/0031803 A1 Feb. 7, 2008

Related U.S. Application Data

(60) Provisional application No. 60/578,850, filed on Jun. 14, 2004, provisional application No. 60/607,597, filed on Sep. 8, 2004.

(30) Foreign Application Priority Data

Jun. 8, 2004 (JP) ................................. 2004-169759
Aug. 31, 2004 (JP) ................................. 2004-251283

(51) Int. Cl.
*C01B 31/00* (2006.01)
*C01B 31/02* (2006.01)
*C01B 31/08* (2006.01)
*C01B 31/10* (2006.01)
*D01F 9/12* (2006.01)
*D01F 9/127* (2006.01)
*B82B 1/00* (2006.01)
*B82B 3/00* (2006.01)

(52) U.S. Cl. ............... 423/447.1; 423/447.2; 423/447.3; 428/367; 428/401; 977/754; 977/832; 977/833; 977/840; 502/180

(58) Field of Classification Search ............... 423/447.1, 423/447.2, 447.3; 428/367, 401; 502/180; 977/754, 832, 833, 840; 524/496

See application file for complete search history.

(56) References Cited

U.S. PATENT DOCUMENTS
4,572,813 A 2/1986 Arakawa
(Continued)

FOREIGN PATENT DOCUMENTS
JP 4-24320 B2 4/1992
(Continued)

*Primary Examiner* — Stuart Hendrickson
(74) *Attorney, Agent, or Firm* — Sughrue Mion, PLLC (57) ABSTRACT

The invention relates to a vapor grown carbon fiber having a mean fiber diameter of 80 to 500 nm, an aspect ratio of 100 to 200 and preferably a bulk density of 0.02 g/cm$^3$ or less, wherein filaments having a diameter within ±20% of the mean fiber diameter occupies 65% (on a number basis) or more of the total. The production method involves thermal decomposition of a carbon source at 800 to 1,300° C. in the presence of, as a catalyst, a transition metal compound having a vapor pressure of 0.13 kPa (1 mmHg) or more at 150° C. and spraying of the carbon source and the transition metal compound in gas form toward the reactor inner wall to allow reaction to proceed. The vapor grown carbon fiber having a larger aspect ratio has excellent dispersibility, and when added in a resin, a smaller amount contributes to enhancement in electroconductivity and thermal conductivity, as compared with a case using conventional one.

13 Claims, 3 Drawing Sheets

U.S. PATENT DOCUMENTS

| | | | |
|---|---|---|---|
| 4,876,078 A | 10/1989 | Arakawa et al. | |
| 6,103,373 A * | 8/2000 | Nishimura et al. | 428/368 |
| 6,143,944 A * | 11/2000 | Hash et al. | 588/15 |
| 6,489,025 B2 * | 12/2002 | Morita et al. | 428/367 |
| 6,489,026 B1 * | 12/2002 | Nishimura et al. | 428/367 |
| 7,122,132 B2 * | 10/2006 | Morita et al. | 252/502 |
| 7,504,153 B2 * | 3/2009 | Kurose et al. | 428/408 |
| 7,585,434 B2 * | 9/2009 | Morita et al. | 252/502 |
| 7,691,782 B2 | 4/2010 | Tanaka | |
| 2004/0247872 A1 | 12/2004 | Sudo et al. | |
| 2006/0133980 A1 | 6/2006 | Nanba et al. | |
| 2006/0188717 A1 | 8/2006 | Kambara et al. | |
| 2006/0286361 A1 | 12/2006 | Yanotake | |
| 2007/0031666 A1 | 2/2007 | Morita et al. | |
| 2007/0092428 A1 | 4/2007 | Sotowa et al. | |
| 2007/0211411 A1 | 9/2007 | Tanaka et al. | |
| 2007/0258881 A1 | 11/2007 | Kambara et al. | |
| 2008/0075651 A1 | 3/2008 | Higashi et al. | |
| 2008/0089828 A1 | 4/2008 | Soga et al. | |
| 2008/0176070 A1 | 7/2008 | Kitazaki et al. | |
| 2009/0008611 A1 | 1/2009 | Oriji et al. | |
| 2009/0080142 A1 | 3/2009 | Nanba et al. | |
| 2009/0176100 A1 | 7/2009 | Higashi et al. | |
| 2009/0275696 A1 | 11/2009 | Yano et al. | |
| 2010/0142122 A1 | 6/2010 | Tanaka | |

FOREIGN PATENT DOCUMENTS

| | | |
|---|---|---|
| JP | 07-150419 | 6/1995 |
| WO | WO 86/03455 A1 | 6/1986 |
| WO | WO 91/03057 A1 | 3/1991 |
| WO | WO 02/49412 A | 6/2002 |
| WO | WO 2004/044289 A | 5/2004 |
| WO | 2004/099477 A2 | 11/2004 |
| WO | 2005/026430 A1 | 3/2005 |

* cited by examiner

VAPOR GROWN CARBON FIBER, PRODUCTION METHOD THEREOF AND COMPOSITE MATERIAL CONTAINING THE CARBON FIBER

CROSS-REFERENCE TO RELATED APPLICATIONS

This is an application filed pursuant to 35 U.S.C. Section 111(a) with claiming the benefit of U.S. provisional application Ser. No. 60/578,850 filed Jun. 14, 2004 and U.S. provisional application Ser. No. 60/607,597 filed Sep. 8, 2004 under the provision of 35 U.S.C. 111(b), pursuant to 35 U.S.C. Section 119(e)(1).

TECHNICAL FIELD

The present invention relates to a vapor grown carbon fiber. More particularly, the present invention relates to a vapor grown carbon fiber which, when dispersed in a matrix such as a resin for preparation of a composite material, exhibits a performance comparable to that of the conventional vapor grown carbon fiber, even in a use amount half or less than the use amount of conventional vapor grown carbon fiber, to a method for producing the carbon fiber; and to a composite material containing the carbon fiber.

BACKGROUND ART

Dispersing carbon fiber in a matrix such as a resin is a widely and commonly performed technique for imparting, for example, electrical conductivity or thermal conductivity. In the case where vapor grown carbon fiber is added to a resin, even with the addition amount relatively small such that moldability of the resultant resin composition and the appearance of a molded product are not adversely affected, the electrical conductivity and thermal conductivity of the resin composition can be greatly improved (Japan Patent No. 2862578, WO91/03057).

In general, in a case where vapor grown carbon fiber is added to a resin or the like, the larger the aspect ratio of the carbon fiber, the higher the property for imparting electrical conductivity and thermal conductivity. A currently commercially available vapor grown carbon fiber (VGCF, registered trademark; product of Showa Denko K. K.) has a mean fiber diameter of about 150 nm, an aspect ratio of about 45 and a fiber length as short as about 6.7 μm.

As an example of carbon fiber having a relatively large fiber length, Japan Patent No. 1701869 (WO86/03455) describes a carbon fiber having an aspect ratio of 100 or more. However, with the small fiber diameter 3.5 to 70 nm of this carbon fiber, the specific surface area is large and the surface energy is high and therefore, the carbon fiber involves problems in that the carbon fiber tends to form an aggregate, that the carbon fiber is difficult to disperse in a resin, and that therefore, a composite material containing the carbon fiber exhibits unsatisfactory characteristics such as electrical conductivity.

DISCLOSURE OF THE INVENTION

An object of the present invention is to provide a carbon fiber which, when added to a matrix such as a resin in a smaller amount as compared with the case of conventional vapor grown carbon fiber, can impart excellent electrical conductivity and thermal conductivity thereto. Another object is to provide a method for producing the carbon fiber.

The present inventors have reviewed reaction conditions for producing vapor grown carbon fiber through thermal decomposition of a carbon source, and have found that when a uniformly mixed gas containing a carbon source and a transition metal compound serving as a catalyst is sprayed toward the inner wall of a reactor, carbon fiber having a specific fiber diameter and a specific aspect ratio is produced, and that when the thus-produced carbon fiber is added to a matrix such as a resin to prepare a composite material, even if the addition amount of the carbon fiber is considerably small as compared with the case of conventional vapor grown carbon fiber, the composite material exhibits excellent electrical conductivity and thermal conductivity. The present invention has been accomplished on the basis of these findings.

Accordingly, the present invention provides a vapor grown carbon fiber, a method for producing the carbon fiber, and a composite material comprising the carbon fiber, which are summarized as follows.

[1] A vapor grown carbon fiber having a mean fiber diameter of 80 to 500 nm and an aspect ratio of 100 to 200, wherein filaments of the carbon fiber having a fiber diameter within ±20% of the mean fiber diameter account for 65% (on a number basis) or more of all the filaments of the carbon fiber.

[2] The vapor grown carbon fiber as described in [1] above, which has a bulk density of 0.02 $g/cm^3$ or less.

[3] The vapor grown carbon fiber as described in [1] above, which has a bulk density of 0.015 $g/cm^3$ or less.

[4] The vapor grown carbon fiber as described in any one of [1] to [3] above, which, when compressed to a bulk density of 0.8 $g/cm^3$, exhibits a resistivity of 0.015 Ωcm or less.

[5] The vapor grown carbon fiber as described in any one of [1] to [4] above, which exhibits a ratio of Id/Ig of 0.2 or less, wherein Id represents the peak height of the band at 1,341 to 1,360 $cm^{-1}$ (d line) in a Raman scattering spectrum of the carbon fiber and Ig represents the peak height (Ig) of the band at 1,570 to 1,580 $cm^{-1}$ (g line) in the spectrum.

[6] The vapor grown carbon fiber as described in any one of [1] to [5] above, which has a mean plane spacing ($d_{002}$) at a (002) plane, as measured by means of X-ray diffractometry, of 0.339 nm or less.

[7] The vapor grown carbon fiber as described in any one of [1] to [6] above, whose surface has undergone oxidation treatment.

[8] A vapor grown carbon fiber formed through aggregation of the carbon fiber as recited in any one of [1] to [7] above, which has a bulk density of 0.04 $g/cm^3$ or more.

[9] A method for producing a vapor grown carbon fiber, comprising thermal decomposition of a carbon source at a temperature of 800 to 1,300° C. in the presence of a transition metal compound as a catalyst and the carbon source and the transition metal compound are sprayed in the form of gas toward the inner wall of a reactor to thereby allow reaction to proceed, wherein the transition metal compound has a vapor pressure of 0.13 kPa (1 mmHg) or more at 150° C.

[10] The method for producing a vapor grown carbon fiber as described in [9] above, wherein a carrier gas is mixed with a raw material gas containing the carbon source and the transition metal compound such that the amount of the carrier gas is 1 to 100 mol on the basis of 1 mol of an organic compound serving as the carbon source, and subsequently the resultant gas mixture is fed to the reactor.

[11] The method for producing a vapor grown carbon fiber as described in [9] or [10] above, wherein, together with the carbon source and the transition metal compound, a sulfur-containing compound having a vapor pressure of 1.3 kPa (10 mmHg) or more at 50° C. is fed in the form of gas to the reactor.

[12] The method for producing a vapor grown carbon fiber as described in [9] above, wherein a solution containing the carbon source, the transition metal compound, and a sulfur-containing compound is heated to 200 to 700° C., thereby gasifying the solution; the thus-gasified product is mixed with a carrier gas; and the resultant gas mixture is sprayed toward the inner wall of the reactor whose temperature has been regulated to 800 to 1,300° C.

[13] A vapor grown carbon fiber produced through the vapor grown carbon fiber production method as recited in any one of [9] to [12] above, which has a mean fiber diameter of 80 to 500 nm and an aspect ratio of 100 to 200, wherein filaments of the carbon fiber having a fiber diameter within ±20% of the mean fiber diameter account for 65% (on a number basis) or more of all the filaments of the carbon fiber.

[14] A composite material comprising a matrix selected from among a resin, a metal and a ceramic material and the vapor grown carbon fiber as recited in any one of [1] to [8] and [13] above, which is dispersed in the matrix.

BEST MODE FOR CARRYING OUT THE INVENTION

The vapor grown carbon fiber of the present invention has a mean fiber diameter of 80 to 500 nm, preferably 80 to 140 nm, more preferably 80 to 110 nm. Filaments of the carbon fiber have less variation in fiber diameter, and filaments of the carbon fiber having a fiber diameter within ±20% of the mean fiber diameter account for 65% (on a number basis) or more, preferably 70% (on a number basis) or more, more preferably 75% (on a number basis) or more, of all the filaments of the carbon fiber. The expression "filaments of the carbon fiber having a fiber diameter within ±20% of the mean fiber diameter account for 65% (on a number basis) or more of all the filaments of the carbon fiber" refers to a case where, for example, when the mean fiber diameter is 100 nm, filaments of the carbon fiber having a fiber diameter of 80 to 120 nm account for 65% or more of all the fiber filaments of the carbon fiber.

The carbon fiber of the present invention, which has the above-described characteristic features, has a mean aspect ratio of 100 to 200.

The vapor grown carbon fiber of the present invention preferably has a bulk density of 0.02 g/cm$^3$ or less, more preferably 0.015 g/cm$^3$ or less. When the bulk density exceeds 0.02 g/cm$^3$, even if the amount of the carbon fiber added to a resin is about 3 mass %, in some cases, virtually no enhancement of electrical conductivity is observed in the resultant composite material. Meanwhile, when the bulk density of the carbon fiber is too low, productivity of composite material which the carbon fiber forms with a resin is reduced. Therefore, the bulk density of the carbon fiber is preferably 0.005 g/cm$^3$ or more.

In order to increase the reproducibility of bulk density measurement, the bulk density of carbon fiber is obtained through the following procedure: produced carbon fiber is heated in an argon atmosphere at 1,000° C. for 15 minutes; the thus-heated carbon fiber is subjected to milling for one minute by use of a mixer (MX-X62, product of Matsushita Electric Industrial Co., Ltd.); the thus-milled carbon fiber is placed in a measuring cylinder and then vibrated for one minute by use of a vibrator (Touch Mixer MT-31, product of Yamato Scientific Co., Ltd.); and subsequently the volume of the resultant carbon fiber is measured, followed by calculation of the bulk density of the carbon fiber.

In the vapor grown carbon fiber of the present invention, preferably, the ratio of the peak height (Id) of the band at 1,341 to 1,360 cm$^{-1}$ (d line) in a Raman scattering spectrum of the carbon fiber to the peak height (Ig) of the band at 1,570 to 1,580 cm$^{-1}$ (g line) in the spectrum; i.e., Id/Ig, is 0.2 or less. The Id/Ig ratio is more preferably 0.05 to 0.2. When the Id/Ig ratio exceeds 0.2, the carbon fiber may exhibit poor crystallinity, and thus a composite material which the carbon fiber forms with a resin cannot exhibit satisfactory electrical conductivity in some cases.

In the vapor grown carbon fiber of the present invention, preferably, the mean plane spacing ($d_{002}$) of the carbon fiber at a (002) plane is 0.339 nm or less as measured by means of X-ray diffractometry. When the $d_{002}$ exceeds 0.339 nm, the carbon fiber may exhibit poor crystallinity, and thus a composite resin material using the carbon fiber cannot exhibit satisfactory electrical conductivity in some cases.

From the viewpoint of efficient incorporation of carbon fiber into a resin, it is preferable that the bulk density of the carbon fiber be high. For this purpose, it is effective to form an aggregate of carbon fiber which is readily broken. In order to form such an aggregate, it is effective to employ a milling technique, a granulation technique, or a compression technique. Examples of the milling technique include a treatment employing a jet mill. Examples of the granulation technique include a treatment employing a Henschel mixer in the presence of a binder. Examples of the compression technique include a technique in which a compressed product of carbon fiber is formed during the aforementioned thermal treatment, and the compressed product is subjected to rough milling by use of a feather mill or the like after the thermal treatment; and a technique in which carbon fiber which has undergone milling and classification is compressed by use of a compactor.

Since the aggregate of carbon fiber with increased bulk density is easily broken through a mixer treatment, the bulk density of such a carbon fiber aggregate must be measured without a mixer treatment which is employed in the aforementioned bulk density measuring method. Specifically, the bulk density is measured through the following procedure: a produced carbon fiber aggregate is heated in an argon atmosphere at 1,000° C. for 15 minutes, and the thus-heated aggregate is placed in a measuring cylinder and then vibrated for one minute by use of a vibrator (Touch Mixer MT-31, product of Yamato Scientific Co., Ltd.), followed by measurement of the bulk density of the aggregate. The more increased the bulk density of a carbon fiber aggregate having a high bulk density, the more readily the carbon fiber is kneaded into the resin, as compared with the carbon fiber which the aggregate originates from. The bulk density of such a carbon fiber aggregate is preferably 0.03 g/cm$^3$ or more, more preferably 0.04 g/cm$^3$ or more.

The vapor grown carbon fiber of the present invention preferably has a resistivity of 0.015 Ωcm or less. When the resistivity exceeds 0.015 Ωcm, even if the amount of the carbon fiber added to a resin is about 2 mass %, in some cases, virtually no enhancement of electrical conductivity is observed in the resultant composite material. Since the resistivity is measured on finely divided carbon fiber, the resistivity value mentioned herein is a value obtained by measuring the resistivity of a product formed by compressing the carbon fiber to a bulk density of 0.8 g/cm$^3$. The resistivity of the carbon fiber is more preferably 0.008 Ωcm or less.

The vapor grown carbon fiber of the present invention readily forms a fiber network and exhibits excellent dispersibility. Therefore, addition of only a small amount of the carbon fiber to a matrix such as a resin improves electrical conductivity and thermal conductivity.

When the carbon fiber produced by the method of the present invention is formed into a compressed product, the product exhibits low resistivity due to formation of a strong fiber network. The vapor grown carbon fiber of the present invention has low bulk density, and when aggregated to form a fibrous mass, its cohesion force is weak and therefore, when the carbon fiber is mixed with a matrix such as a resin, the carbon fiber is well dispersed in the matrix.

The vapor grown carbon fiber of the present invention, which exhibits the above-described characteristic features, can be produced by means of a method in which a carbon source is thermally decomposed in the presence of a transition metal compound serving as a catalyst; specifically, the carbon source and the transition metal compound are sprayed in the form of gas toward the inner wall of a reactor, to thereby subject the carbon source to thermal decomposition reaction.

The carbon source (organic compound), which serves as a raw material of the carbon fiber, may be any gasifiable organic compound. However, preferably, the carbon source is an organic compound which is gasified at a lower temperature. Specific examples of the carbon source which may employed include aromatic compounds such as benzene, toluene, and xylene; linear hydrocarbons such as hexane and heptane; cyclic hydrocarbons such as cyclohexane; alcohols such as methanol and ethanol; gasoline; and kerosene of these, aromatic compounds are preferred, with benzene being most preferred. These carbon sources may be employed singly or in combination of two or more species.

The transition metal compound, which serves as a catalyst, is preferably an organometallic compound or inorganic compound containing a transition metal belonging to Groups 4 to 10. Particularly, an organometallic compound containing a transition metal such as Fe, Ni, or Co is preferred.

In the present invention, the transition metal compound is subjected to reaction in the form of gas. Therefore, there is employed a transition metal compound having a high vapor pressure; specifically, a transition metal compound having a vapor pressure of 133 Pa (1 mmHg) or more at 150° C. Specific examples of such a compound include ferrocene and nickelocene.

The diameter and length of carbon fiber to be produced, and the amount of particles contained can be controlled by regulating the concentration of the transition metal compound in the raw material, thereby regulating the amount of catalyst particles required for carbon fiber formation. In order to produce carbon fiber having a fiber diameter of 80 nm or more, the amount of ferrocene is preferably regulated to 1 to 5 mass %, more preferably 2 to 4 mass %, on the basis of the entirety of the carbon source. When the amount of the catalyst to be employed exceeds the above range, the fiber diameter of the resultant carbon fiber is excessively decreased, and kneading the carbon fiber into a matrix such as a resin becomes difficult. In contrast, when the amount of the catalyst to be employed is less than the above range, a large amount of carbon particles is generated.

Addition of a sulfur source to the raw material enables further enhancement of productivity of the carbon fiber. The sulfur source may be any gasifiable sulfur compound. However, preferably, the sulfur source is a sulfur compound having a high vapor pressure; specifically, a sulfur compound having a vapor pressure of 10 mmHg or more at 50° C. Examples of such a sulfur source include organic sulfur compounds such as thiophene; and inorganic sulfur compounds such as hydrogen sulfide. Particularly, thiophene is preferred. These sulfur sources may be employed singly or in combination of two or more species.

In the present invention, the aforementioned carbon source, transition metal compound, and sulfur source which is an optional component are fed in the form of gas to a reactor, to thereby allow reaction to proceed. In this case, the carbon source, transition metal compound, and sulfur source may be separately gasified, and the thus-gasified materials may be mixed together before being brought into the reactor. However, preferably, a liquid raw material is prepared from the carbon source, transition metal compound and sulfur source, and the thus-prepared raw material is gasified and then brought into the reactor.

The raw material gas is sprayed toward the inner wall of the reactor. This spraying process can heat the raw material efficiently and promote thermal decomposition of the raw material, whereby carbon fiber filaments having less variation in fiber diameter can be produced at high yield.

Figure 1:
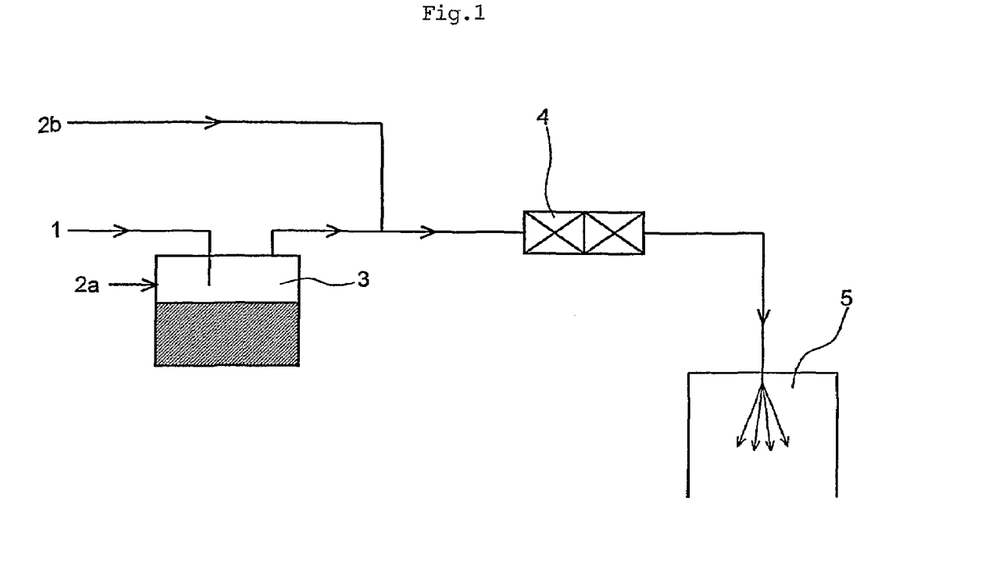
FIG. 1 shows an apparatus flow diagram of the production method of the vapor grown carbon fiber of the present invention.

FIG. 1 shows a flow diagram of the vapor grown carbon fiber production method of the present invention.

A liquid raw material (1) is brought into a gasifier (3) by use of a liquid feed pump (not illustrated), whereby a raw material gas is prepared. In order to attain a constant composition of the raw material gas, preferably, the entire amount of the liquid raw material is gasified. The gasifier is heated to a temperature such that the liquid raw material is completely gasified and the liquid raw material is not decomposed. The heating temperature is preferably 200 to 700° C., more preferably 350 to 550° C. The liquid raw material is efficiently gasified by spraying the raw material to the inner wall of the gasifier through a spray nozzle unit. In order to control the feed rate of the raw material gas, a carrier gas (2a) may be brought into the gasifier. However, from the viewpoint of reduction of load to the heater of the gasifier, it is preferable that the flow rate of the carrier gas be as low as possible.

The thus-gasified raw material is mixed with a carrier gas (2b) before being subjected to thermal reaction. The carrier gas preferably contains a reducing gas such as hydrogen gas, and is employed upon feeding of the raw material and catalyst to a thermal decomposition zone for the purpose of inducing and maintaining the catalytic activity of the transition metal. The amount of the carrier gas is preferably 1 to 100 mol on the basis of 1.0 mol of the organic compound serving as the carbon source. In production of carbon fiber exhibiting good dispersibility, it is important how uniformly concentrated the raw material gas is before the gas is brought into the thermal decomposition zone (reactor) (5). In order to enhance the uniformity of the concentration of the raw material gas, the liquid raw material must be completely gasified in the gasifier, as well as the raw material gas and the carrier gas must be mixed together sufficiently. From the viewpoint of complete gasification of the liquid raw material, it is preferable that appropriate selection of the carbon source, transition metal compound and sulfur compound be made. Also, from the viewpoint of sufficient mixing of the raw material gas and the carrier gas, it is preferable that a static mixer (STP) (stirring apparatus) (4) be employed.

When the raw material gas is brought into the reactor (5), the raw material gas is thermally decomposed, whereby carbon fiber is produced. The temperature in the interior of the reactor is regulated to 800 to 1,300° C., preferably 900 to 1,250° C. As the reactor, a reactor formed of a material which endures a reaction temperature of 1,300° C., such as alumina, zirconia, magnesia, silicon nitride, or silicon carbide may be used. The reactor preferably assumes a tubular form. The tubular reactor (reaction tube) is heated by means of a heater provided outside the tube. By increasing the residence time of the raw material in the reactor so that the raw material is completely decomposed, the yield of carbon fiber is enhanced. Specifically, the residence time of the raw material in the reactor at 1,250° C. is 2 to 10 seconds, preferably 4 to 6 seconds.

The carbon fiber produced through the aforementioned reaction as is may be used without any treatment. Alternatively, the carbon fiber may be used after heated at about 800 to about 2,000° C. for removal of impurities therefrom, or may be used after heated at 2,000° C. or higher for enhancement of crystallinity thereof.

In order to improve wettability of the carbon fiber to a matrix, thereby increasing the strength of the interface between the carbon fiber and the matrix, the carbon fiber may be subjected to surface modification. The surface modification is preferably surface oxidation. Surface oxidation of the carbon fiber may be performed by means of, for example, the following technique: heating of the carbon fiber in the presence of an oxidative gas, immersion of the carbon fiber in an oxidative liquid, or heating of the thus-immersed carbon fiber. From the viewpoint of convenience, preferably, the surface oxidation is performed by heating the carbon fiber in air at 300 to 800° C.

The vapor grown carbon fiber of the present invention exhibits excellent characteristics such as high electrical conductivity and thermal conductivity. Therefore, when the carbon fiber is mixed into a matrix such as a resin, a metal, or a ceramic material, thereby preparing a composite material, the resultant composite material exhibits can be improved in characteristics such as high electrical conductivity and thermal conductivity. Particularly in the case where the carbon fiber is added to a resin to prepare a composite material, even when the amount of added carbon fiber is ½ (on a mass basis) to ⅓ or less that of conventional vapor grown carbon fiber, the composite material exhibits electrical conductivity comparable to that of a composite material containing the conventional vapor grown carbon fiber; i.e., the vapor grown carbon fiber of the present invention exhibits excellent effects.

Specifically, a resin/carbon fiber composite material, which is employed in an antistatic material or the like, generally requires addition of 5 to 15 mass % carbon fiber for attaining desired characteristics (e.g., electrical conductivity). In contrast, addition of only a small amount (2 to 8 mass %) of the vapor grown carbon fiber of the present invention attains such desired characteristics. Meanwhile, addition of the vapor grown carbon fiber of the present invention to a metal enables enhancement of the fracture strength of the resultant composite material.

The resin matrix in which the carbon fiber of the present invention is to be dispersed may be a thermoplastic resin or a thermosetting resin. Examples of the resin matrix include polyethylene (PE), polypropylene, nylon, urethane, polyacetal, polyphenylene sulfide, polystyrene, polycarbonate, polyphenylene ether, polyethylene terephthalate, polybutylene terephthalate, polyarylate, polysulfone, polyether-sulfone, polyimide, polyoxybenzoyl, polyether-ether-ketone, polyether-imide, Teflon (registered trademark), silicon-containing resin, cellulose acetate resin, ABS resin, AES resin, ABMS resin, AAS resin, phenolic resin, urea resin, melamine resin, xylene resin, diallyl phthalate resin, epoxy resin, aniline resin, and furan resin.

Examples of the ceramic matrix include aluminum oxide, mullite, silicon oxide, zirconium oxide, silicon carbide, and silicon nitride.

Examples of the metal matrix include gold, silver, aluminum, iron, magnesium, lead, copper, tungsten, titanium, niobium, hafnium, alloys thereof, and mixtures thereof.

EXAMPLES

The present invention will next be described in more detail by way of Examples, which should not be construed as limiting the invention thereto.

Example 1

Vapor grown carbon fiber was produced by use of apparatuses as shown in the flow diagram of FIG. 1.

As a reaction tube (5) was employed a vertical heating furnace (inner diameter: 370 mm, length: 2,000 mm) having, on its top, a nozzle unit for supplying raw material gas.

The temperature of a gasifier (3) was regulated to 500° C. Nitrogen gas was caused to pass through the reaction system, to thereby purge oxygen gas from the system. Subsequently, hydrogen gas was caused to pass through the system, to thereby fill the system with hydrogen gas. Thereafter, the temperature of the reaction tube was elevated to 1,250° C. Reaction was initiated by feeding a liquid raw material (30 g/min) into the gasifier by use of a pump. The thus-gasified raw material was fed into a path by use of hydrogen gas (50 L/min) serving as a carrier gas. Before being fed into the reaction tube, the raw material gas was further mixed with hydrogen gas (400 L/min) by use of a static mixer (4). The liquid raw material was prepared by dissolving ferrocene (0.5 kg) and thiophene (0.13 kg) in benzene (14 kg). The ferrocene and thiophene contents in the liquid raw material were found to be 3.5 mass % and 0.9 mass %, respectively.

Reaction was allowed to proceed under the above-described conditions for one hour, to thereby yield vapor grown carbon fiber.

The resultant carbon fiber was heated in an argon atmosphere at 2,800° C. for 30 minutes, to thereby produce target carbon fiber.

Figure 3:
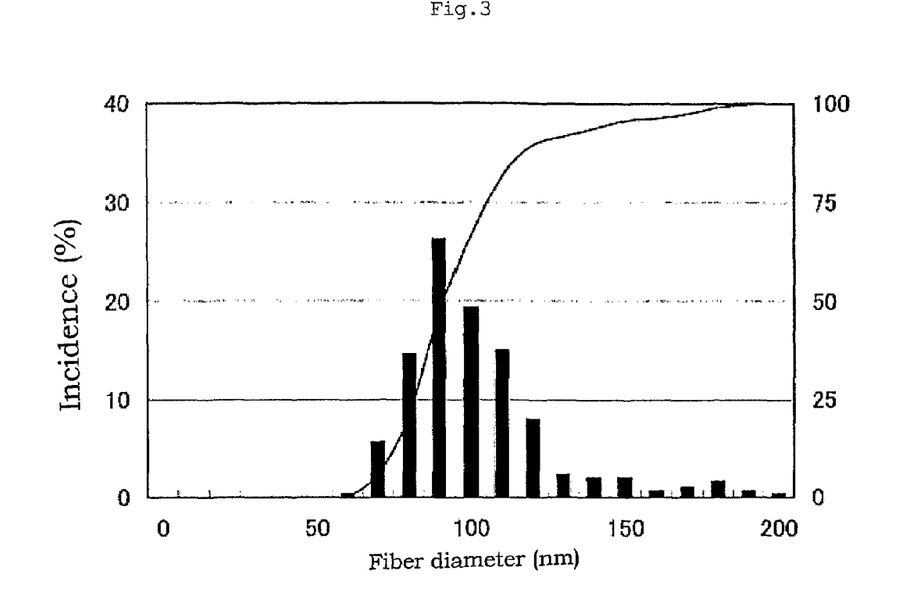
FIG. 3 shows the fiber diameter distribution profile of the carbon fiber produced in Example 1.

The thus-produced carbon fiber was found to have a bulk density of 0.012 g/cm$^3$. The carbon fiber was found to exhibit a resistivity of 0.007 Ωcm when being compressed to a bulk density of 0.8 g/cm$^3$. Through observation of 100 filaments of the carbon fiber under a scanning electron microscope, the mean fiber diameter and the mean fiber length were calculated. As a result, the mean fiber diameter was found to be 96.9 nm (standard deviation: 23.4 nm), and the mean fiber length was found to be 13 μm (mean aspect ratio: 130). FIG. 3 shows the fiber diameter distribution profile of the carbon fiber. Filaments of the carbon fiber having a fiber diameter falling within a range of ±20% the mean fiber diameter were found to account for 75% (on a number basis) of all the filaments of the carbon fiber. The carbonization yield (i.e., the mass of the produced carbon fiber/the mass of the fed benzene) was found to be 50%.

Through Raman scattering spectroscopy, the carbon fiber was found to exhibit an Id/Ig of 0.16. X-ray diffractometry results revealed that the carbon fiber showed $d_{002}$ of 0.338 nm.

Example 2

Figure 2:
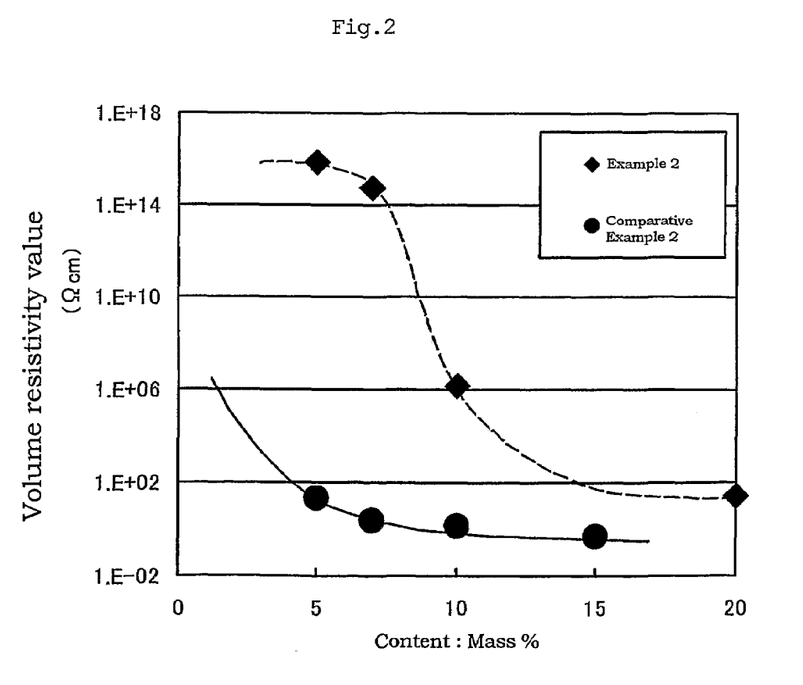
FIG. 2 is a graph showing the volume resistivities of composite materials produced in Example 2 and Comparative Example 2, the volume resistivities being measured by means of the four-probe method.

By use of a 30-mmφ one-directional twin-screw extruder (product of Ikegai, Ltd.), the vapor grown carbon fiber produced in Example 1 was dispersed in polycarbonate in different amounts ranging from 5 to 15 mass %, to thereby prepare different carbon fiber/polycarbonate composite materials. The preparation rate was regulated to 3 kg/h. Each of the thus-prepared composite materials was molded into a plate (100 mm×100 mm×2 mm thick) by use of a 75-t injection molding apparatus (product of FANUC LTD.). The volume resistivity of the plate was measured by means of the four-probe method. The results are shown in FIG. 2.

Example 3

The vapor grown carbon fiber produced in Example 1 was compressed to a density of 0.1 g/cm³, and then the thus-compressed fiber was milled by use of a feather mill, to thereby yield carbon fiber having a bulk density of 0.04 g/cm³. By use of a 30-mmφ one-directional twin-screw extruder (product of Ikegai, Ltd.), the resultant carbon fiber was dispersed in polycarbonate in an amount of 5 mass %, to thereby prepare a carbon fiber/polycarbonate composite material. The preparation rate was regulated to 10 kg/h. The thus-prepared composite material was molded into a plate (100 mm×100 mm×2 mm thick) by use of a 75-t injection molding apparatus (product of FANUC). The volume resistivity of the plate was measured by means of the four-probe method, and was found to be 1×10² Ωcm.

Example 4

Vapor grown carbon fiber was produced by use of apparatuses as shown in the flow diagram of FIG. 1.

As a reaction tube (5) was employed a vertical heating furnace (inner diameter: 370 mm, length: 2,000 mm) having, on its top, a nozzle unit for supplying raw material gas.

The temperature of a gasifier (3) was regulated to 500° C. Nitrogen gas was caused to pass through the reaction system, to thereby purge oxygen gas from the system. Subsequently, hydrogen gas was caused to pass through the system, to thereby fill the system with hydrogen gas. Thereafter, the temperature of the reaction tube was elevated to 1,250° C. Reaction was initiated by feeding a liquid raw material (100 g/min) into the gasifier by use of a pump. The thus-gasified raw material was fed into a path by use of hydrogen gas (50 L/min) serving as a carrier gas. Before being fed into the reaction tube, the raw material gas was further mixed with hydrogen gas (540 L/min) by use of a static mixer (4). The liquid raw material was prepared by dissolving ferrocene (0.5 kg) and thiophene (0.13 kg) in benzene (14 kg). The ferrocene and thiophene contents in the liquid raw material were found to be 3.5 mass % and 0.9 mass %, respectively.

Reaction was allowed to proceed under the above-described conditions for one hour, to thereby yield vapor grown carbon fiber.

The resultant carbon fiber was heated in an argon atmosphere at 2,800° C. for 30 minutes, to thereby produce target carbon fiber.

Figure 5:
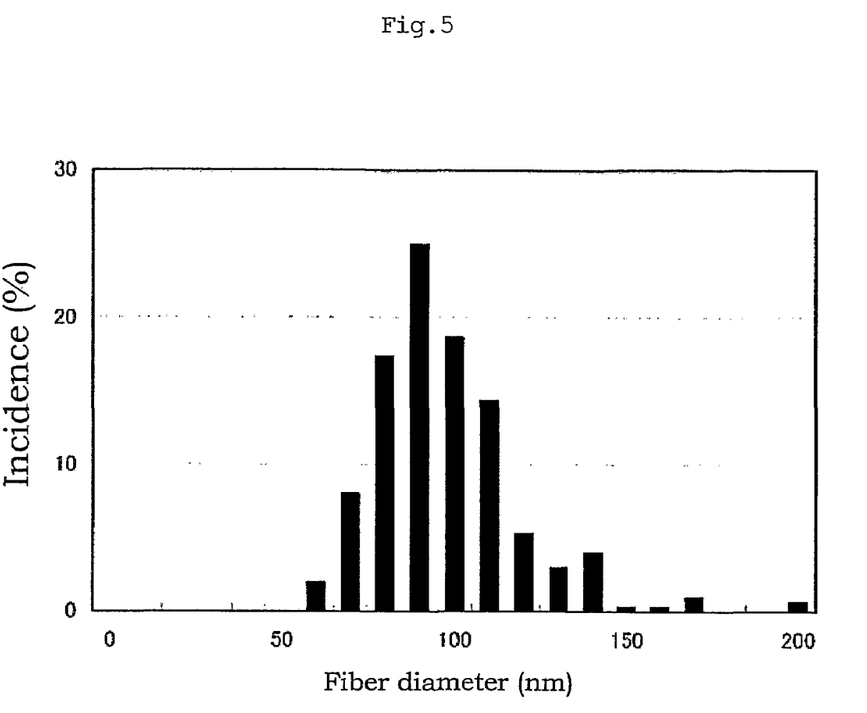
FIG. 5 shows the fiber diameter distribution profile of the carbon fiber produced in Example 4.

The thus-produced carbon fiber was found to have a bulk density of 0.015 g/cm³. The carbon fiber was found to exhibit a resistivity of 0.008 Ωcm when being compressed to a bulk density of 0.8 g/cm³. Through observation of 100 filaments of the carbon fiber under a scanning electron microscope, the mean fiber diameter and the mean fiber length were calculated. As a result, the mean fiber diameter was found to be 93 nm (standard deviation: 24.1 nm), and the mean fiber length was found to be 10 μm (mean aspect ratio: 120). FIG. 5 shows the fiber diameter distribution profile of the carbon fiber. Filaments of the carbon fiber having a fiber diameter falling within a range of ±20% the mean fiber diameter were found to account for 73% (on a number basis) of all the filaments of the carbon fiber. The carbonization yield (i.e., the mass of the produced carbon fiber/the mass of the fed benzene) was found to be 50%.

Through Raman scattering spectroscopy, the carbon fiber was found to exhibit an Id/Ig of 0.17. X-ray diffractometry results revealed that the carbon fiber showed $d_{002}$ of 0.338 nm.

Comparative Example 1

As a reaction tube was employed a vertical heating furnace (inner diameter: 370 mm, length: 2,000 mm) having, on its top, a two-fluid hollow cone nozzle unit for supplying raw material. Nitrogen gas was caused to pass through the reaction system, to thereby purge oxygen gas from the system. Subsequently, hydrogen gas was caused to pass through the system, to thereby fill the system with hydrogen gas. Thereafter, the temperature of the reaction tube was elevated to 1,250° C. By use of a pump, a liquid raw material (130 g/min) and hydrogen gas (20 L/min) were fed through the nozzle unit, and hydrogen gas (400 L/min) was fed through a flange provided on the upper portion of the reaction tube, to thereby allow reaction to proceed. The liquid raw material was sprayed to the inner wall of the reaction tube. The liquid raw material was prepared by dissolving ferrocene (0.83 kg) and sulfur (0.059 kg) in benzene (14 kg). The ferrocene and sulfur contents in the liquid raw material were found to be 5.5 mass % and 0.39 mass %, respectively.

Reaction was allowed to proceed under the above-described conditions for one hour, to thereby produce carbon fiber. The thus-produced carbon fiber was found to have a bulk density of 0.04 g/cm³. The carbon fiber was found to exhibit a resistivity of 0.03 Ωcm when being compressed to a bulk density of 0.8 g/cm³.

Figure 4:
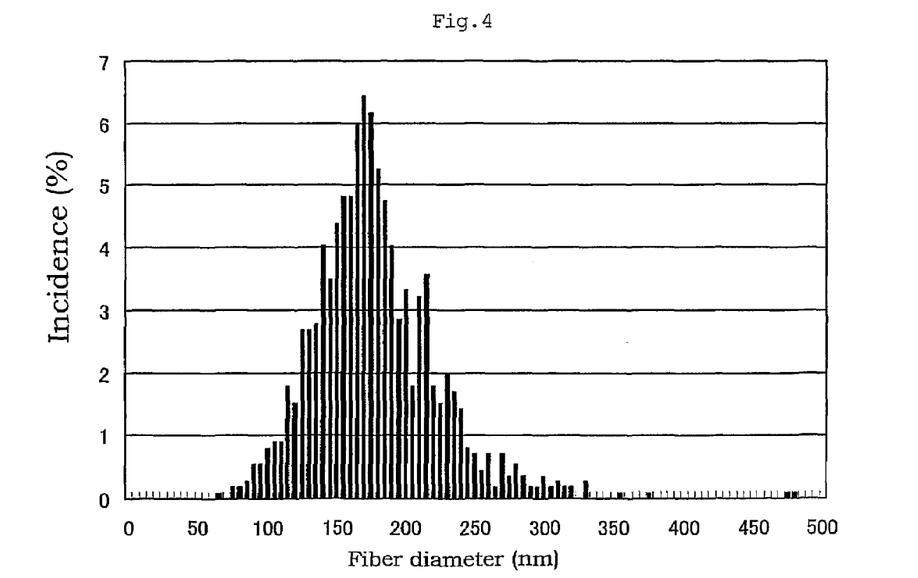
FIG. 4 shows the fiber diameter distribution profile of the carbon fiber produced in Comparative Example 1.

The thus-produced carbon fiber was observed under an electron microscope. As a result, the mean fiber diameter was found to be about 180 nm (standard deviation: 37.4 nm), and the mean fiber length was found to be 7 μm (aspect ratio: 47). FIG. 4 shows the fiber diameter distribution profile of the carbon fiber. Filaments of the carbon fiber having a fiber diameter falling within a range of ±20% the mean fiber diameter were found to account for 60% (on a number basis) of all the filaments of the carbon fiber. The carbonization yield (i.e., the mass of the produced carbon fiber/the mass of the fed benzene) was found to be 60%.

Through Raman scattering spectroscopy, the carbon fiber was found to exhibit an Id/Ig of 0.23. X-ray diffractometry results revealed that the carbon fiber showed $d_{002}$ of 0.340 nm.

Comparative Example 2

The vapor grown carbon fiber produced in Comparative Example 1 was baked at 1,000° C. for 15 minutes, and then graphitized at 2,800° C. for 15 minutes. By use of a 30-mmφ one-directional twin-screw extruder (product of Ikegai, Ltd.), the resultant carbon fiber was dispersed in polycarbonate in different amounts ranging from 5 to 20 mass %, to thereby prepare different carbon fiber/polycarbonate composite materials. Each of the thus-prepared composite materials was molded into a product by use of a thermal press, and the volume resistivity of the molded product was measured by means of the four-pin probe method. The results are shown in FIG. 2.

As is clear from FIG. 2, in the case of incorporation of 5 mass % vapor grown carbon fiber, the volume resistivity of the composite material of Comparative Example 2 is about $1.0 \times 10^{16}$ Ωcm, whereas the volume resistivity of the composite material of Example 2 is $1.0 \times 10^2$ Ωcm or less. Meanwhile, in the case of the composite material of Example 2, the amount of vapor grown carbon fiber required for attaining a volume resistivity of about $1.0 \times 10^2$ Ωcm is 5 mass %, which is about ¼ the amount of vapor grown carbon fiber required for attaining such a volume resistivity in the composite material of Comparative Example 2 (i.e., about 20 mass %). Thus, in the case where a composite material is prepared from the vapor grown carbon fiber of Examples, even when the addition amount of the carbon fiber is smaller than that of the vapor grown carbon fiber of Comparative Examples (i.e., conventional vapor grown carbon fiber), the composite material exhibits electrical conductivity, etc. comparable to those of a composite material containing the conventional vapor grown carbon fiber.

INDUSTRIAL APPLICABILITY

According to the production method of the present invention, carbon fiber having a specific filament diameter and a specific aspect ratio can be obtained by spraying a uniform gas composed of a carbon source, a transition metal compound serving as a catalyst onto the inner wall of the reactor.

Further, when the carbon fiber and a resin are made into a composite material, excellent electroconductivity and thermal conductivity can be imparted to the composite material even with a addition amount much smaller than that of conventional vapor grown carbon fiber.

The invention claimed is:

1. A vapor grown carbon fiber having a mean fiber diameter of 80 to 500 nm and an aspect ratio of 100 to 200 and which has a bulk density of 0.02 g/cm³ or less, wherein filaments of the carbon fiber having a fiber diameter within ±20% of the mean fiber diameter account for 65% (on a number basis) or more of all the filaments of the carbon fiber.

2. A composite material comprising a matrix selected from among a resin, a metal and a ceramic material and the vapor grown carbon fiber as recited in claim 1, which is dispersed in the matrix.

3. The vapor grown carbon fiber as claimed in claim 1, which has a bulk density of 0.015 g/cm³ or less.

4. The vapor grown carbon fiber as claimed in claim 1, which, when compressed to a bulk density of 0.8 g/cm³, exhibits a resistivity of 0.015 Ωcm or less.

5. The vapor grown carbon fiber as claimed in claim 1, which exhibits a ratio of Id/Ig of 0.2 or less, wherein Id represents the peak height of the band at 1,341 to 1,360 cm$^{-1}$ (d line) in a Raman scattering spectrum of the carbon fiber and Ig represents the peak height (Ig) of the band at 1,570 to 1,580 cm$^{-1}$ (g line) in the spectrum.

6. The vapor grown carbon fiber as claimed in claim 1, which has a mean plane spacing ($d_{002}$) at a (002) plane, as measured by means of X-ray diffractometry, of 0.339 nm or less.

7. The vapor grown carbon fiber as claimed in claim 1, whose surface has undergone oxidation treatment.

8. A vapor grown carbon fiber formed through aggregation of the carbon fiber as recited in claim 1, which has a bulk density of 0.04 g/cm³ or more.

9. A method for producing a vapor grown carbon fiber, comprising thermal decomposition of a carbon source at a temperature of 800 to 1,300° C. in the presence of a transition metal compound as a catalyst and the carbon source and the transition metal compound are sprayed in the form of gas toward the inner wall of a reactor to thereby allow reaction to proceed, wherein the transition metal compound has a vapor pressure of 0.13 kPa (1 mmHg) or more at 150° C., and wherein the gasified raw material is mixed with a carrier gas before the gas is brought into a reactor and a stirring apparatus is employed during the mixing.

10. The method for producing a vapor grown carbon fiber as claimed in claim 9, wherein a carrier gas is mixed with a raw material gas containing the carbon source and the transition metal compound such that the amount of the carrier gas is 1 to 100 mol on the basis of 1 mol of an organic compound serving as the carbon source, and subsequently the resultant gas mixture is fed to the reactor.

11. The method for producing a vapor grown carbon fiber as claimed in claim 9, wherein, together with the carbon source and the transition metal compound, a sulfur-containing compound having a vapor pressure of 1.3 kPa (10 mmHg) or more at 50° C. is fed in the form of gas to the reactor.

12. The method for producing a vapor grown carbon fiber as claimed in claim 9, wherein a solution containing the carbon source, the transition metal compound, and a sulfur-containing compound is heated to 200 to 700° C., thereby gasifying the solution; the thus-gasified product is mixed with a carrier gas; and the resultant gas mixture is sprayed toward the inner wall of the reactor whose temperature has been regulated to 800 to 1,300° C.

13. A vapor grown carbon fiber produced through the vapor grown carbon fiber production method as recited in claim 9, which has a mean fiber diameter of 80 to 500 nm and an aspect ratio of 100 to 200 and which has a bulk density of 0.02 g/cm³ or less, wherein filaments of the carbon fiber having a fiber diameter within ±20% of the mean fiber diameter account for 65% (on a number basis) or more of all the filaments of the carbon fiber.

* * * * *